United States Patent [19]

Oikawa et al.

[11] Patent Number: 5,677,734

[45] Date of Patent: Oct. 14, 1997

[54] METHOD AND APPARATUS FOR MODIFYING THE QUANTIZATION STEP OF EACH MACRO-BLOCK IN A VIDEO SEGMENT

[75] Inventors: Yuka Oikawa, Chiba; Naofumi Yanagihara, Tokyo; Nobuaki Izumi, Chiba, all of Japan

[73] Assignee: Sony Corporation, Tokyo, Japan

[21] Appl. No.: 515,529

[22] Filed: Aug. 15, 1995

[30] Foreign Application Priority Data

Aug. 19, 1994 [JP] Japan .................... 6-195230

[51] Int. Cl.⁶ .................................... H04N 7/12
[52] U.S. Cl. .................... 348/405; 348/420; 386/112
[58] Field of Search .................... 348/405, 419; 382/251; 341/200; 358/335, 342, 310; 360/9.1; 386/112, 46; H04N 7/12

[56] References Cited

U.S. PATENT DOCUMENTS

| | | | |
|---|---|---|---|
| 5,073,820 | 12/1991 | Nakagawa et al. | 348/405 |
| 5,144,426 | 9/1992 | Tanaka et al. | 348/409 |
| 5,291,228 | 3/1994 | Nakagawa et al. | 348/384 |
| 5,335,016 | 8/1994 | Nakagawa | 348/405 |
| 5,347,310 | 9/1994 | Yamada et al. | 348/405 |
| 5,349,384 | 9/1994 | Oguro | 348/405 |
| 5,374,958 | 12/1994 | Yanagihara | 348/405 |
| 5,404,168 | 4/1995 | Yamada et al. | 348/405 |

*Primary Examiner*—Tommy P. Chin
*Assistant Examiner*—Y. Lee
*Attorney, Agent, or Firm*—William S. Frommer; Alvin Sinderbrand

[57] ABSTRACT

A method and apparatus for recording digital video signals in which digital video signals in the form of DCT coefficients, obtained by e.g., discrete cosine transform, are quantized and compressed so as to be recorded on a recording medium. A first quantization step decision unit determines a quantization step in terms of a video segment made up of plural macro-blocks as a unit so that the quantity of quantized data is less than a pre-set data quantity. A second quantization step decision unit determines a quantization step in terms of the macro-blocks as a unit so that the quantity of quantized data is less than the pre-set data quantity. A quantization unit quantizes the digital video signals with the quantization steps determined by the first quantization step decision unit and the second quantization step decision unit. This enables efficient encoding and improved picture quality.

8 Claims, 10 Drawing Sheets

| 0 | 5 | 6 | 11 | 12 | 17 | 18 | 23 | 24 |
|---|---|---|----|----|----|----|----|----|
| 1 | 4 | 7 | 10 | 13 | 16 | 19 | 22 | 25 |
| 2 | 3 | 8 | 9  | 14 | 15 | 20 | 21 | 26 |

MACRO BLOCK ONE SUPER BLOCK $S_{i,j}$ : $M_{i,j,k}$ (k=0,1,...26) (j=0,1,...4) (i=0,1,...19) FOR 1125/60
(i=0,1,...23) FOR 1150/50

- DC : 9bits of DC coefficient.
- mo : One bit indicates the mode information of DCT.(8×8/2×4×8)
- cl : 2bits indicate the class number.

METHOD AND APPARATUS FOR MODIFYING THE QUANTIZATION STEP OF EACH MACRO-BLOCK IN A VIDEO SEGMENT

BACKGROUND OF THE INVENTION

Cross-References to Related Patents

As applications pertinent to the present application, the U.S. Pat. Nos. 5,321,440 and 5,317,413 are proposed by the present Assignee. In addition, JP Patent Applications Nos. 03-317497 (filing date, Nov. 5, 1991), 04-196219 (filing date, Jun. 30, 1992), 04-213716 (filing date, Jul. 17, 1992), 04-181577 (filing date, Jun. 17, 1992) and 05-223226 (filing date, Sep. 8, 1993) are also proposed by the present Assignee. Each of the above applications is owned by the present Assignee and is hereby incorporated by reference.

1. Field of the Invention

This invention relates to a method and apparatus for recording digital video signals in which digital video signals in the form of DCT coefficients, obtained by e.g., discrete cosine transform, are quantized and compressed so as to be recorded on a recording medium. More particularly, it relates to a method and apparatus for recording digital video signals advantageously employed for a digital video tape recorder for recording/reproducing video signals for the high definition television system.

2. Description of the Related Art

In recent years, developments of a digital video tape recorder in which video signals are converted into digital signals and encoded using a high efficiency encoding system such as discrete cosine transform (DCT) and the resulting encoded data is recorded and/or reproduced on or from a magnetic tape using a rotary head, are proceeding briskly.

The digital VTR may be set to a mode for recording video signals of the current television system, such as the NTSC system, referred to herein as a SD mode, or to a mode for recording video signals of the high definition television system, referred to herein as a HD mode.

By the recording system of the above-mentioned digital VTR, the video signals are compressed and recorded as digital video signals of approximately 25 Mbps and as digital video signals of approximately 50 Mbps for the SD mode and for the HD mode, respectively.

In the method for recording the digital video signals in the above-mentioned recording system, the video signal, converted into the digital signals, are divided into blocks of a suitable size, such as DCT blocks of 8×8 pixels. Six DCT blocks of luminance data, one DCT block of R-Y data and one DCT block of B-Y data, totalling eight blocks, make up one macro-block.

A plurality of macro-blocks are shuffled, that is, five macro-blocks at discrete positions on a picture are assembled into one unit. Two-dimensional DCT is then carried out on the unit basis, with the block size of 8×8.

Data obtained by the two-dimensional DCT, that is DCT coefficients, are stored in a memory on the unit basis. The total number of codes are estimated on the unit basis and the quantization steps are determined which will give the total number of codes which is smaller than a pre-set value.

The DCT coefficients are then quantized on the unit basis, with the thus determined quantization step, and variable length encoded by the Huffman code. The resulting quantized units are accommodated in video segments by way of framing.

The codes thus quantized and accommodated in a fixed bit length range on the unit basis, that is on the video segment basis, are re-arrayed in a sequence in which the macro-blocks are arrayed in continuous sequence on the picture, so as to be recorded at pre-set positions on the magnetic tape.

With the above-described conventional recording method for the digital video signals, a sole quantization step is accorded to each video segment and all DCT coefficients in each video segment are quantized with the thus accorded quantization step. That is, the same quantization step is accorded to plural macro-blocks. Thus the quantization step is determined so that the total number of quantized codes on setting the fixed bit length on the video segment basis will be less than a pre-set value. However, it is a frequent occurrence that the actual mount of quantized codes on fixed length coding becomes significantly smaller than the above-mentioned pre-set value, so that efficient encoding cannot be achieved. On the other hand, the degree of quantization for the respective blocks becomes coarse with the result that the picture cannot be improved in quality.

SUMMARY OF THE INVENTION

It is therefore an object of the present invention to provide a method and apparatus for digital video signals in which the quantization step determined on the video segment basis is shifted on the macro-block basis so that the quantization steps will be determined on the macro-block basis for enabling efficient encoding and improving the picture quality.

According to the present invention, there is provided a method for recording quantized and encoded digital video signals comprising the steps of determining a quantization step in terms of a video segment made up of plural macro-blocks as a unit so that the quantity of quantized data is less than a pre-set data quantity, determining a quantization step in terms of the macro-blocks as a unit so that the quantity of quantized data is less than the pre-set data quantity, and quantizing the digital video signals with the determined quantization steps.

With the above method for recording digital video signals, the quantization step is determined on the macro-block basis by giving priority to the macro-block which is located at a mid portion of a picture.

According to the present invention, there is also provided an apparatus for recording quantized and encoded digital video signals comprising first quantization step decision means for determining a quantization step in terms of a video segment made up of plural macro-blocks as a unit so that the quantity of quantized data is less than a pre-set data quantity, second quantization step decision means for determining a quantization step in terms of the macro-blocks as a unit so that the quantity of quantized data is less than the pre-set data quantity, and quantization means for quantizing the digital video signals with the quantization steps determined by the first quantization step decision means and the second quantization step decision means.

With the above apparatus for recording digital video signals, the quantization step is determined on the macro-block basis by giving priority to the macro-block which is located at a mid portion of a picture.

With the above method for recording digital video signals, a quantization step is determined in terms of the macro-blocks as a unit so that the quantity of quantized data is less than a pre-set data quantity. On the other hand, a quantization step is also determined in terms of the macro-blocks as a unit so that the quantity of quantized data is less than the pre-set data quantity. The digital video signals are quantized with the quantization steps thus determined and the quantized and encoded digital video signals are recorded on a recording medium. This enables the degree of quantization to be refined in a range of a pre-set data quantity of the quantized data to render it possible to make effective utilization of redundant bits, thus assuring efficient encoding and improved picture quality.

With the above method for recording digital video signals, since the quantization step is determined on the macro-block basis by giving priority to the macro-block which is located at a mid portion of a picture, the picture of satisfactory quality can be obtained in a mid portion of the picture which may be noticed most readily by the eye, thus further assuring improved picture quality.

With the apparatus for recording digital video signals, the first quantization step decision unit determines a quantization step in terms of a video segment made up of plural macro-blocks as a unit so that the quantity of quantized data is less than a pre-set data quantity, while the second quantization unit decision unit determines a quantization step in terms of the macro-blocks as a unit so that the quantity of quantized data is less than the pre-set data quantity. The quantization unit quantizes the digital video signals with the quantization steps determined by the first quantization step decision unit and the second quantization step decision unit. This enables the degree of quantization to be refined in a range of a pre-set data quantity of quantized data to render it possible to make effective utilization of redundant bits, thus assuring efficient encoding and improved picture quality.

With the above apparatus for recording digital video signals, since the quantization step is determined on the macro-block basis by giving priority to the macro-block which is located at a mid portion of a picture, the picture of satisfactory picture quality can be obtained in a mid portion of the picture which may be noticed most readily by the eye, thus further assuring improved picture quality.

DETAILED DESCRIPTION OF PREFERRED EMBODIMENTS

Referring to the drawings, preferred embodiments of the present invention will be described in detail.

Figure 1:
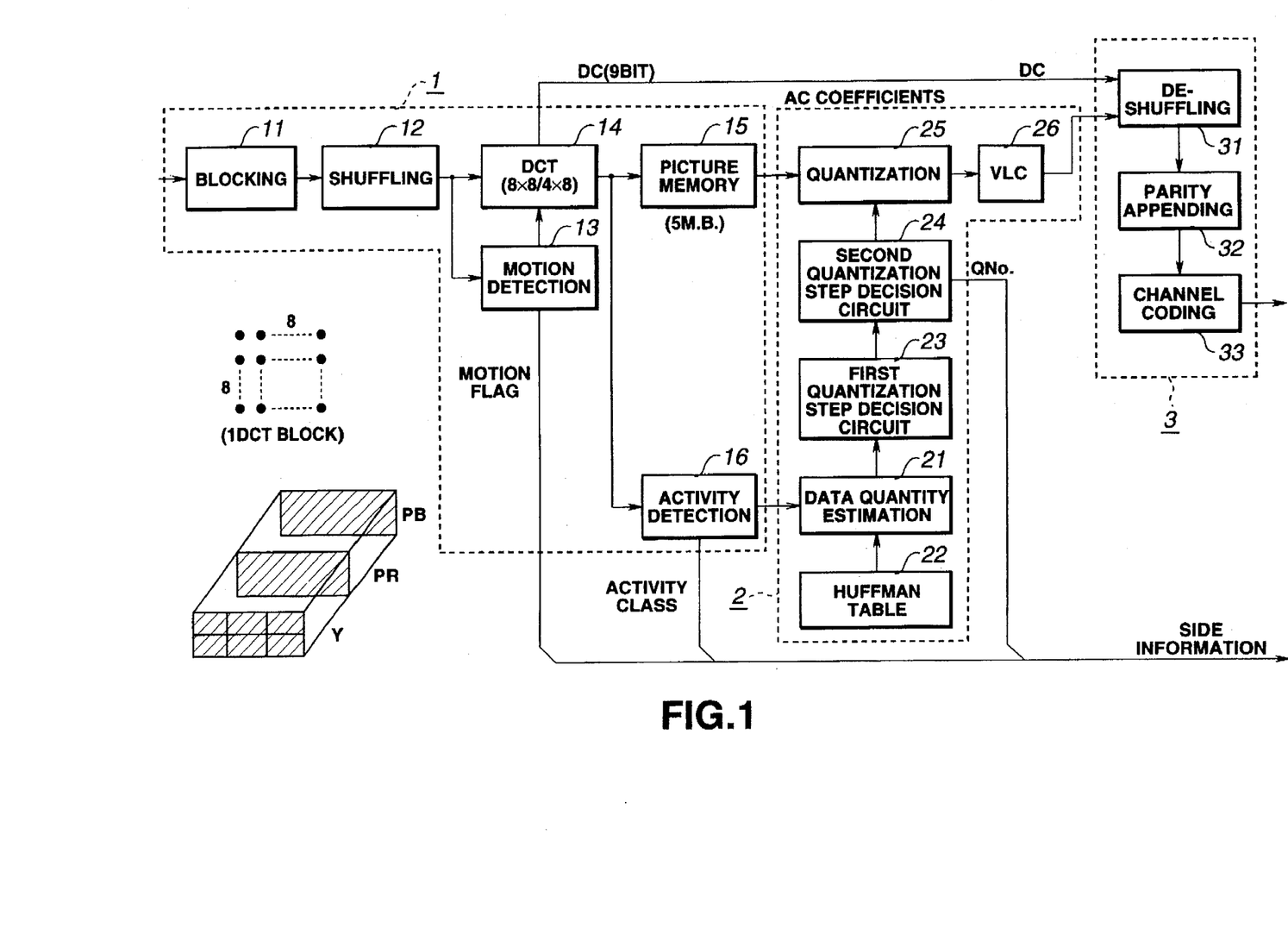
FIG. 1 is a block diagram showing an arrangement of an encoder of a recording apparatus for digital video signals for carrying out the recording method of digital video signals according to an embodiment of the present invention.

The digital video signal recording method is carried out by a recording method for digital video signals having an encoder configured as shown in FIG. 1.

That is, the encoder has a transform unit 1 for processing macro-blocks of the digital video signals with discrete cosine transform (DCT), an encoding unit 2 and a framing unit 3. The encoding unit 2 is configured for quantizing DCT coefficients resulting from DCT with a quantization step determined on the macro-block basis by shifting the quantization step determined on the basis of units each made up of plural macro-blocks.

The transform unit 1 includes a blocking circuit 11 for dividing the digital video signals into 8×8-pixel blocks, a shuffling circuit 12 for effecting macro-block based shuffling, a motion detection circuit 13, a DCT circuit 14 for effecting two-dimensional DCT with the block size of 8×8, a picture memory 15 and an activity detection circuit 16.

The encoding unit 2 includes a data quantity estimating circuit 21, a Huffman table 22 for effecting variable length coding, a first quantization step decision circuit 23, a second quantization step decision circuit 24, a quantization circuit 25 and a variable length encoding circuit 26. The data quantity estimating circuit calculates the data quantity following quantization, and the first quantization step decision circuit 23 determines the quantization step within a range of a pre-set quantity of quantized data in terms of units each consisting of five macro-blocks. The second quantization step decision circuit 24 determines the quantization steps within a range of a pre-set quantity of quantized data in terms of macro-units. The quantization circuit 25 effects quantization with quantization steps determined by the first quantization step decision circuit 23 and the second quantization step decision circuit 24. The variable length encoding circuit 26 variable length encodes the quantized data from the quantization circuit 25. The framing circuit 3 has a deshuffling circuit 31, a parity appending circuit 32 and a channel encoding circuit 33.

The processing performed by the transform unit 1 is explained.

The blocking circuit 11, fed with input digital video data, forms DCT blocks, each consisting of an array of 8×8 pixels, totalling 64 pixels, from luminance data Y, data $C_R$ and data $C_B$ of the same domain. The data $C_R$ is the color difference data R-Y, while the data $C_B$ is the color difference data B-Y. That is, the blocking circuit forms one macro-block from six DCT blocks of luminance data Y, one DCT block of color difference data $C_R$ and one DCT block of color difference data $C_B$, and outputs the resulting macro-block.

Figure 2:
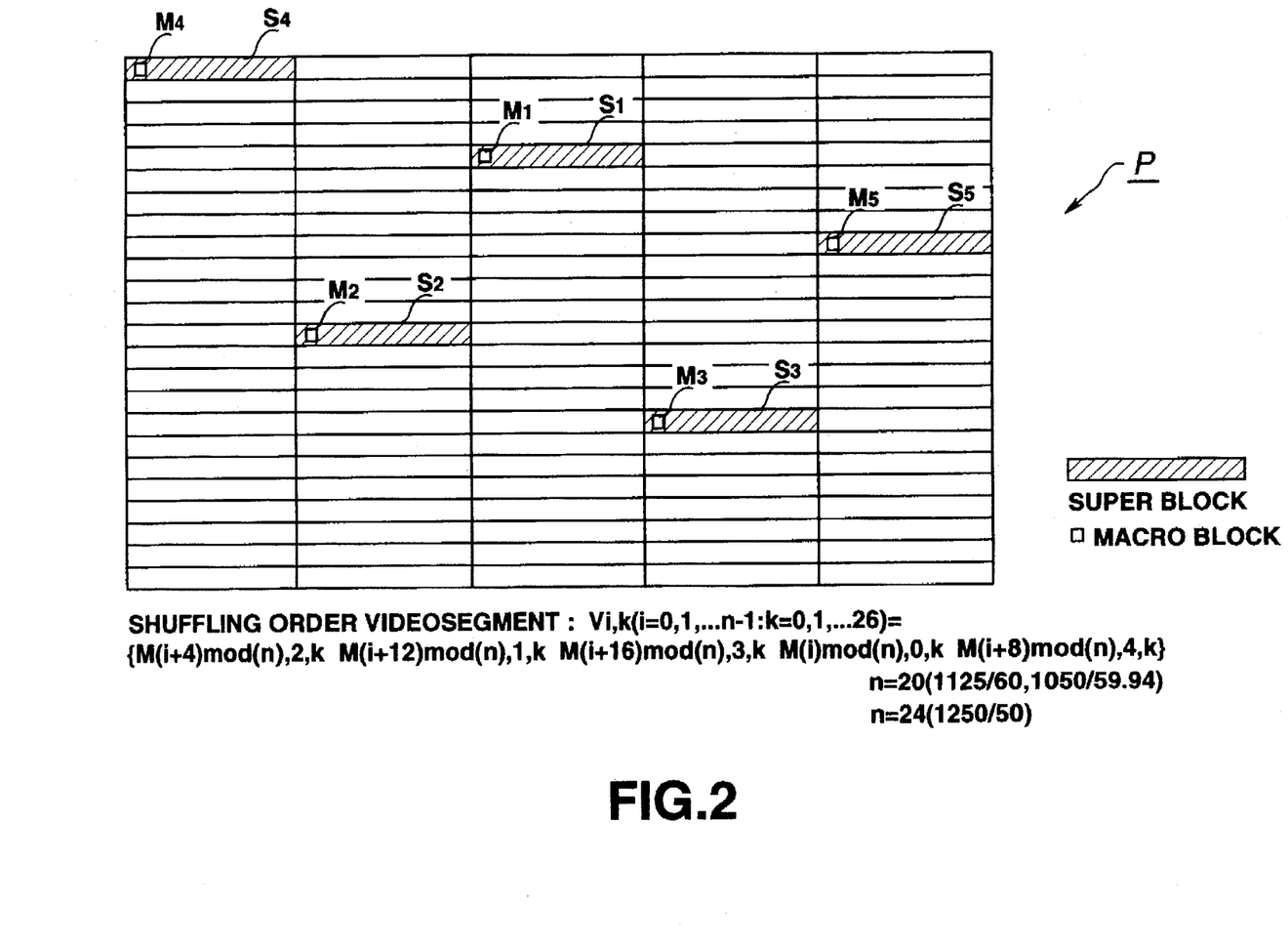
FIG. 2 illustrates a shuffling operation for five macro-blocks.

The shuffling circuit 12 effects pre-set macro-block based shuffling on the digital video signals macro-blocked by the blocking circuit 11. After shuffling the macro-blocks, each one macro-block is taken out from each of super macro-blocks S1 to S5 which are separated from one another on a picture P and which are made up each of 27 macro-blocks, as shown in FIG. 2. Thus, five macro-blocks $M_1$ to $M_5$ are collected to form a sole fixed length forming unit, which is outputted. The fixed length forming unit is referred to herein simply as a unit.

The shuffling sequence in the above shuffling operation conforms to the equations $$V_{i,k} = \begin{Bmatrix} M(i+4)\bmod(n), & 2,k \\ M(i+12)\bmod(n), & 1,k \\ M(i+12)\bmod(n), & 3,k \\ M(i)\bmod(n), & 0,k \\ (M(i+8)\bmod(n), & 4,k \end{Bmatrix}$$

where n is the number of lines, i is the line index (i=0 to n−1) and k is the scanning order index for respective pixels of the super blocks $S_1$ to $S_5$ (k=0 to 26). Consequently, five macro-blocks $M_1$ to $M_5$ are selected, beginning from the macro-block at the center of the picture P shown in FIG. 2, that is the macro-block $M_1$ of the super macro-block $S_1$, followed by the macro-block $S_2$ of the super macro-block S5, ... the macro-block $M_5$ of the super macro-block $M_5$.

Figure 3:
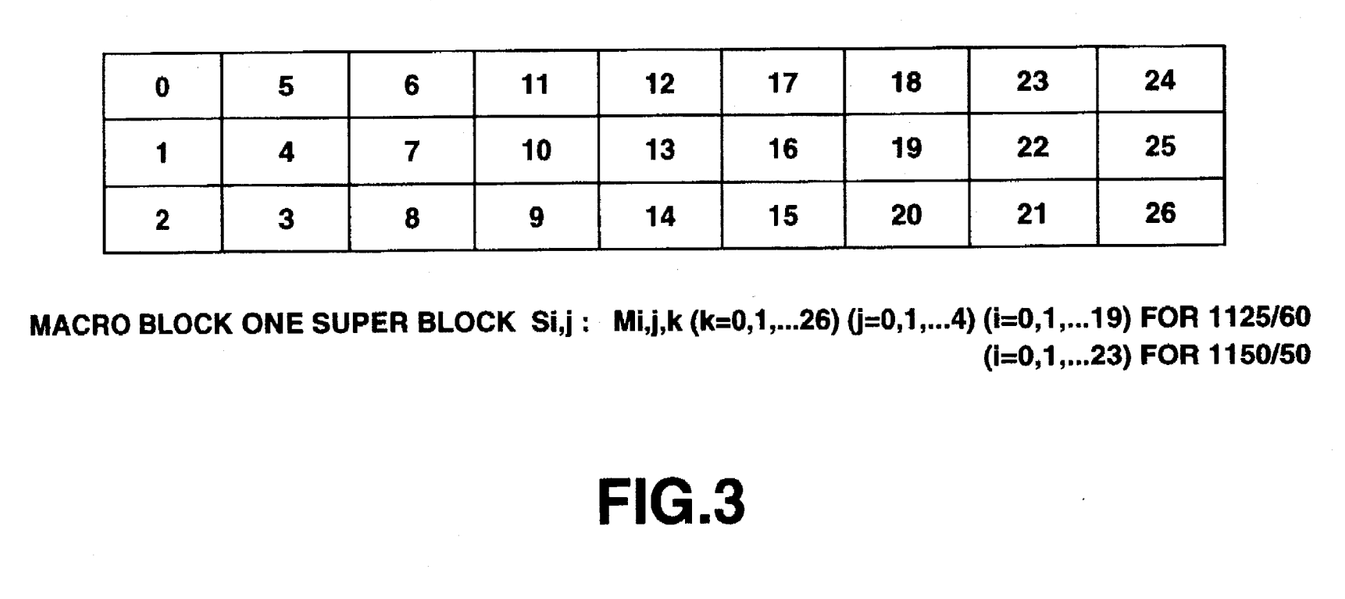
FIG. 3 illustrates the order of scanning in a super-block in the shuffling operation.

On the other hand, the macro-blocks of each of the super macro-blocks $S_1$ to $S_5$ are scanned in the sequence of the macro-block 0, macro-block 1, macro-block 2, ... macro-block 26, as shown in FIG. 3.

The motion detection circuit 13 effects motion detection in terms of five macro-blocks formed into one unit by the shuffling circuit 12. The results of motion detection are fed to the DCT circuit 14, while being outputted as the subsidiary information to e.g., a reproducing system, not shown.

The DCT circuit 14 performs DCT on picture data devoid of motion, in terms DCT blocks each made of 8×8 pixels, based upon the results of detection by the motion detection circuit 13. On the other hand, the DCT circuit 14 performs DCT on sum data or differential data between fields of picture data exhibiting motion in terms of 2 DCT blocks each made up of 8×4 pixels. The DCT circuit 14 outputs dc components to the framing unit 3, while outputting ac components to the picture memory 15.

The picture memory 15 transiently stores the ac components resulting from DCT by the DCT circuit 14 in terms of units.

The activity detection unit 16 detects, as the information specifying the activity of a picture, the maximum value of the ac components resulting from DCT by the DCT circuit 14 of the one-unit data stored in the picture memory 15 and outputs the results of detection as the subsidiary information to e.g., a reproducing system, not shown.

The operation of each circuit in the encoding unit 2 is explained.

The data quantity estimation circuit 21 is responsive to the results of unit-based activity detection by the activity detection circuit 12 to classify the ac components stored in the picture memory 15 in association with the degree of quantization at the time of quantization.

In order for fixed-length picture data to be obtained on the unit basis from the variable-length encoding circuit 26 fed with the output of the quantization circuit 25, the first quantization step decision circuit 23 calculates an optimum quantization step for the luminance data Y, color difference data $C_R$ and the color difference data $C_B$, based upon the information of classification from the estimation circuit 21 and the codes in the Huffman table 22.

The second quantization step decision circuit 24 determines, from the quantization step determined on the unit basis by the first quantization step decision circuit 23, the quantization step for each of the five macro-blocks in the unit within a range lesser than targeted fixed bit length. The quantization step is determined on the macro-block basis so that priority is given a macro-block among the five macro-blocks which is located closer the center of the picture.

The quantization circuit 25 quantizes the one-unit data (ac components) stored in the picture memory 15 at a quantization step as determined by the second quantization step decision circuit 24, and transmits the resulting quantization data to the variable length encoding circuit 26.

The variable length encoding circuit 26 encodes the five macro-blocks, quantized by the quantization circuit 25, using e.g., the Huffman code, so that each macro-block is formed by 77 bytes, inclusive of the quantization step information.

The operation of determining the quantization step in the first quantization step decision circuit 23 and the second quantization step decision circuit 24 is explained in detail.

Figure 4:
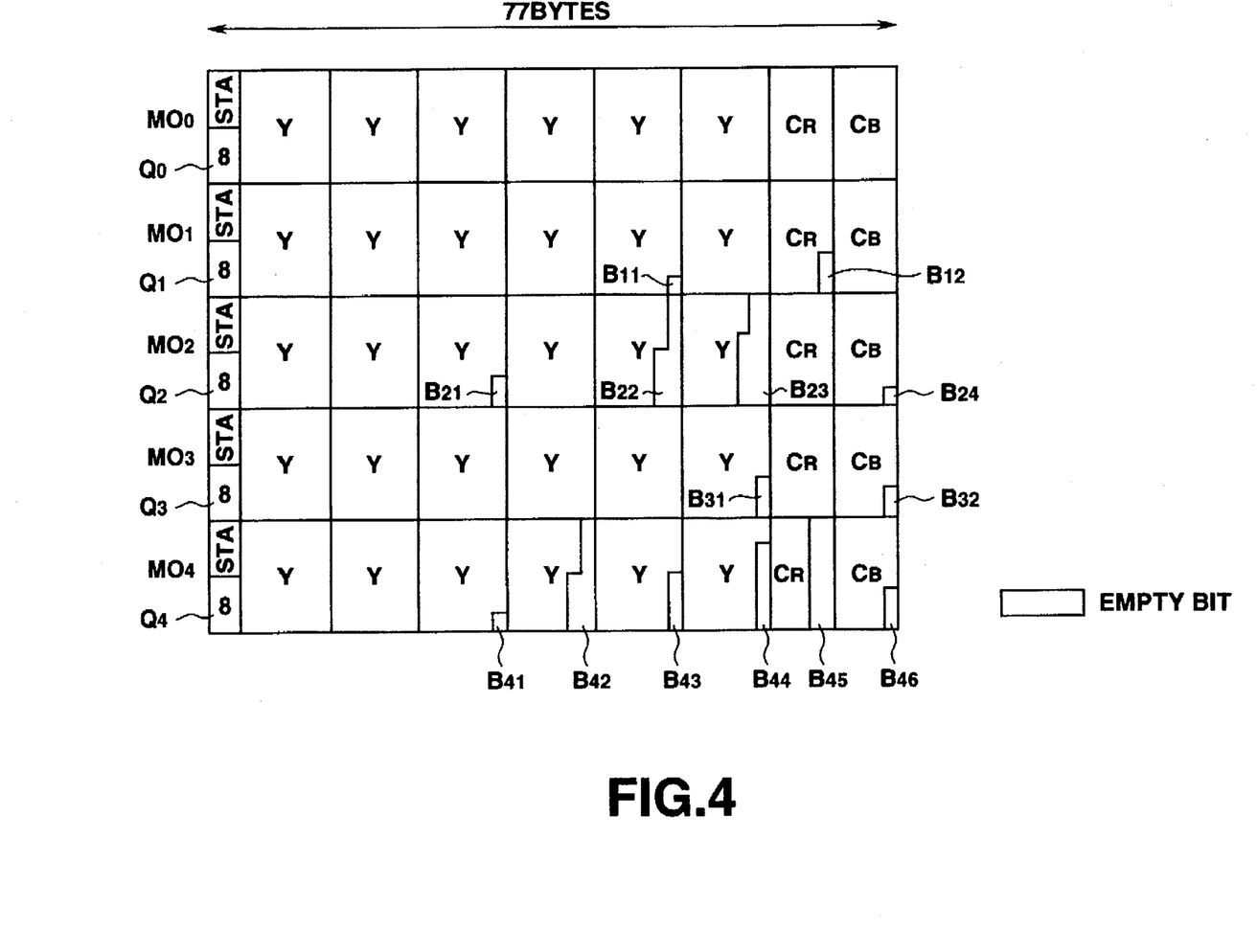
FIG. 4 illustrate the state of fixed length encoded and quantized macro-blocks when the quantization steps are determined by the first quantization step decision means of the encoder.

If the quantization step Q, determined on the unit basis by the first quantization step decision circuit 23, is 8 (Q=8), the same quantization step $Q_0$ to $Q_4$ ($Q_0$ to $Q_4$=8) is accorded to each of the five macro-blocks $MO_0$ to $MO_4$ of the unit, to which the quantization step Q=8 is accorded, as shown in FIG. 4.

If data of the five macro-blocks are quantized with the same quantization step Q=8, vacant regions $B_{11}$ to $B_{12}$, $B_{21}$ to $B_{24}$, $B_{31}$ to $B_{32}$ and $B_{41}$ to $B_{46}$ are present in the macro-blocks $MO_1$, $MO_2$, $MO_3$ and $MO_4$, respectively, as shown in FIG. 4.

Since the quantization step information can be accorded to each of the macro-blocks, the second quantization step decision circuit 24 shift the quantization steps $Q_0$ to $Q_4$ of the macro-blocks $MO_0$ to $MO_4$ shown in FIG. 4 in a direction of refining the quantization degree within the range less than the target fixed bit length value.

The order of priority in shifting the quantization step is the macro-block $MO_0$, $MO_1$, ..., $MO_4$, thus beginning from the upper side macro-block. That is, the macro-blocks $MO_0$ to $MO_4$ are respectively associated with the macro-blocks $MO_0$ to $MO_4$ shown in FIG. 2 and hence are selected beginning from the macro-block located near the center of the picture. That is, the quantization step is determined so that priority will be given the macro-blocks located closer to the center of the picture.

Figure 5:
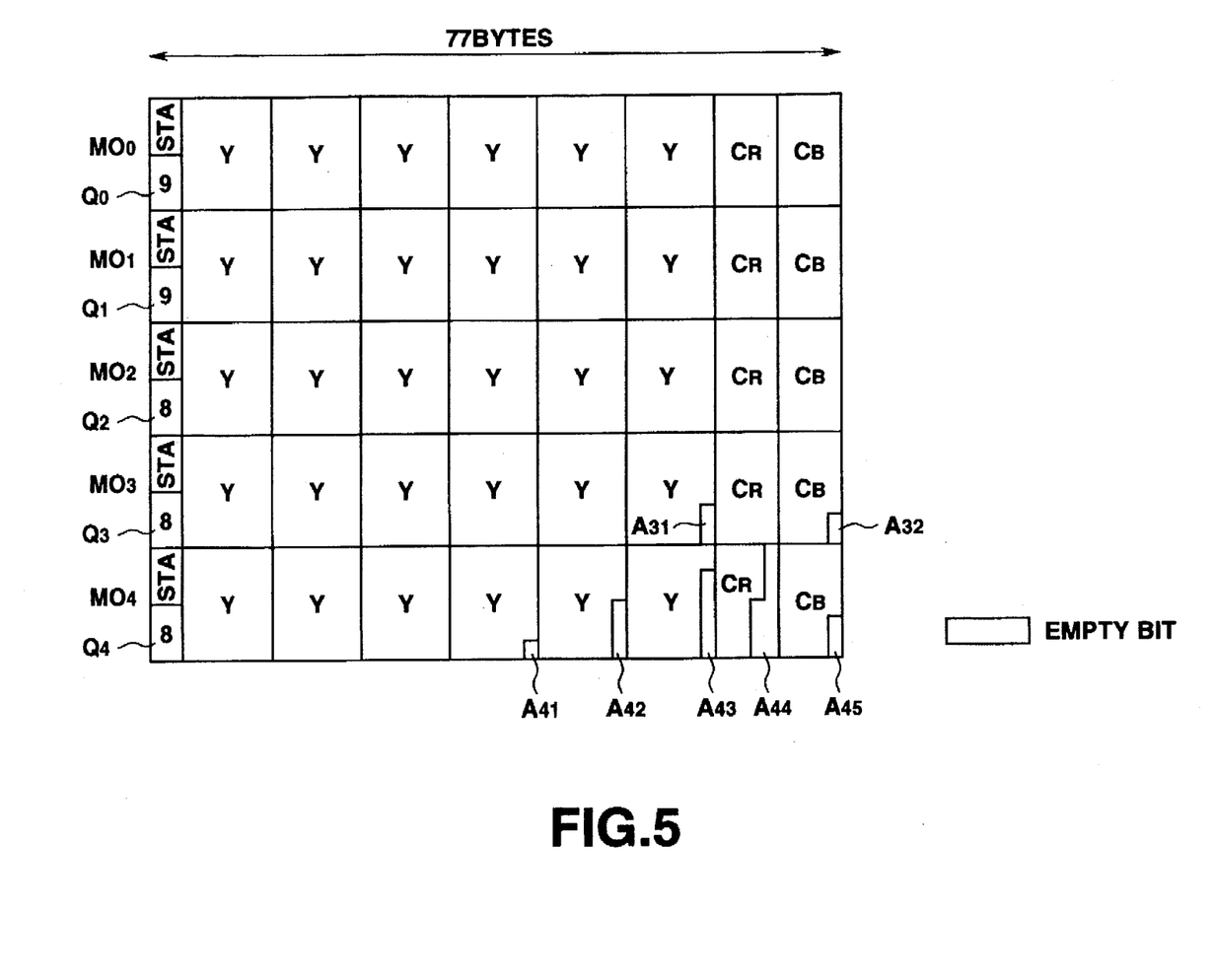
FIG. 5 illustrate the state of fixed length encoded and quantized macro-blocks when the quantization steps are determined by the second quantization step decision means of the encoder.

If the quantization step is determined on the macro-block basis in the second quantization step decision circuit 24 as described above, the quantization step $Q_0$ of the macro-block $MO_0$ becomes finer by one and is now 9 ($Q_0$=9), while the quantization step $Q_1$ of the macro-block $MO_1$ becomes finer by one and is now 9 ($Q_0$=9), as shown in FIG. 5. Consequently, the vacant region comprises the vacant regions $A_{31}$ to $A_{32}$ of the macro-block $MO_3$ and the vacant regions $A_{41}$ to $A_{45}$ of the macro-block $MO_4$.

By determining the quantization step on the macro-block basis within the range of the targeted fixed bit length, redundant bits may be effectively utilized, while a picture of a high picture quality may be produced. In addition, by refining the quantization steps of the five macro-blocks in the order of the quantization steps $Q_0Q_1, \ldots Q_4$, the finer quantization steps are selected preferentially beginning from the central portion of the picture, so that satisfactory picture quality may be obtained at the central region of the picture which is most outstanding to the viewer.

Figure 6:
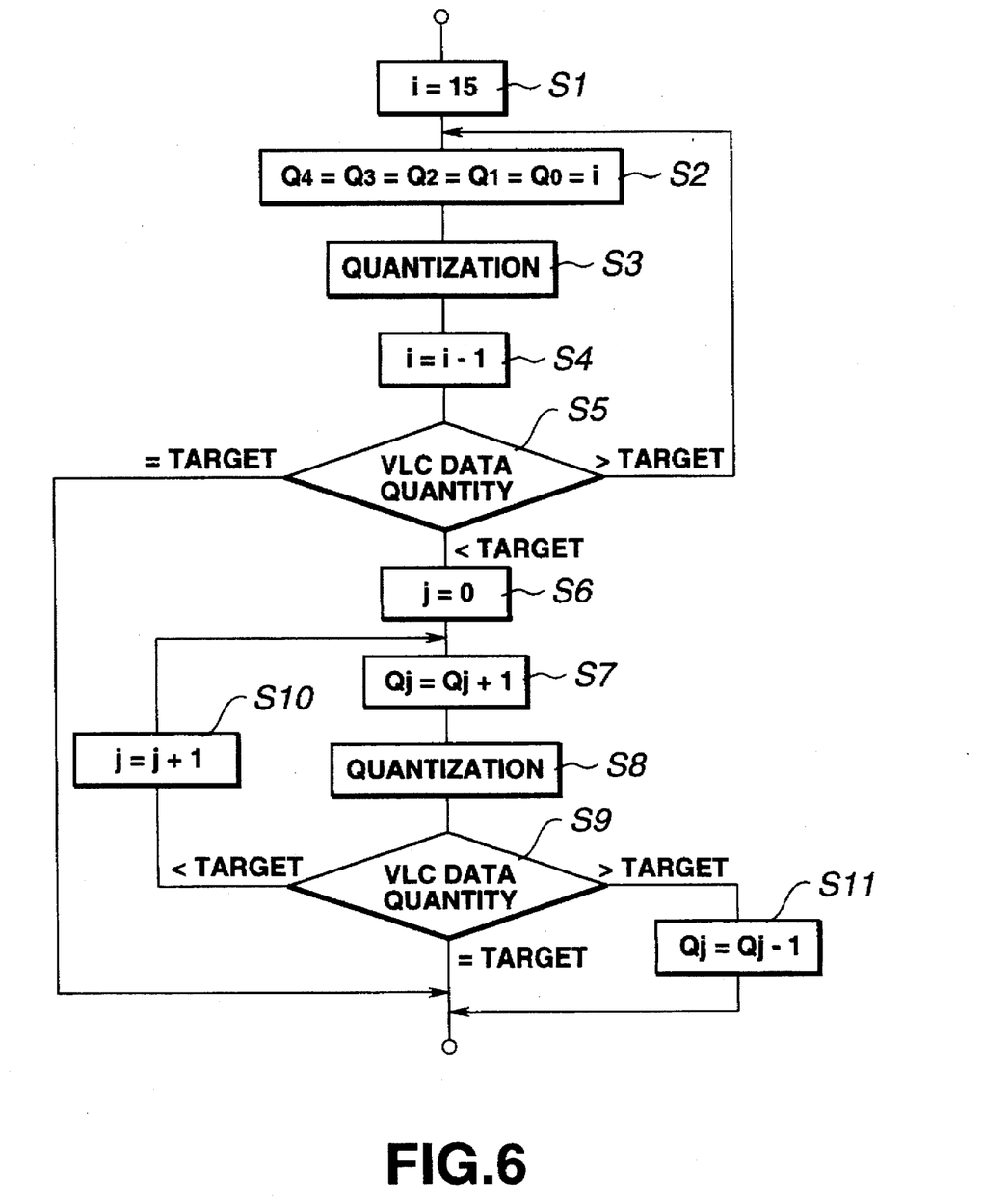
FIG. 6 is a flow chart for illustrating the process of determining the quantization step by the first quantization step decision means and the second quantization step decision means.

Referring to the flow chart shown in FIG. 6, the process of determining the quantization step in the first quantization step decision circuit 23 and the second quantization step decision circuit 24 is explained.

In the first quantization step decision circuit 23, the first quantization i is initialized (i=15). The quantization steps are 0 to 15, in which the larger the number, the finer is the quantization step.

The quantization steps $Q_0$ to $Q_4$ of the five macro-blocks $M_0$ to $MO_4$ are set at step S2 to the first quantization step i (=$Q_4$=$Q_3$=$Q_2$=$Q_1$=$Q_0$).

Then, at step S3, the five macro-blocks $M_0$ to $M_4$ are quantized with the quantization step i (=$Q_4$=$Q_3$=$Q_2$=$Q_1$=

$Q_0$), while the resulting quantized data is variable-length encoded using the Huffman table 22.

Then, at step S4, the first quantization step i is rendered rougher, that is decremented ($i=i-i$).

It is then judged at step S5 whether the quantity of the quantized data resulting from quantization at step S3 is less than the targeted fixed bit length value, whether the quantity of the resulting quantized data is more than the targeted fixed bit length value target, or whether the quantity of the resulting quantized data is equal to the targeted fixed bit length value target.

If, as a result of judgment at step S5, the quantity of the produced quantized data exceeds the fixed length value target, processing reverts to step S2 in order to effect at step S3 the quantization with a quantization step rougher by one and in order to repeat the steps S4 and S5.

Alternatively, if the quantity of the produced quantized data is equal to the fixed length value target, the first quantization step i is set as quantization steps $Q_0$ to $Q_4$ for the macro-blocks $M_0$ to $M_4$. The quantization steps $Q_0$ to $Q_4$ for the macro-blocks $M_0$ to $M_4$ are then outputted to the quantization circuit 25 without performing the macro-block based quantization step determining process (steps S6–S11) which is to be explained subsequently.

Alternatively, if the quantity of the produced quantized data is lower than the fixed length value target, the second quantization step decision circuit 24 initializes, at step S6, the index j (j: $0 \leq j \leq 4$) of the macro-blocks $M_0$ to $M_4$ (j=0). The circuit 24 then refines at step S7 the quantization step information $Q_j$ of the jth macro-block $M_j$ by one ($Q_j=Q_j+1$).

At step S8, the circuit 24 then quantizes the macro-block $M_j$ with the new quantization step $Q_j$ determined at the step S7, while variable length encoding the quantized data using the Huffman table 22.

It is then judged at step S9 whether the quantity of the quantized data resulting from quantization at step S8 is less than the targeted fixed length value, whether the quantity of the resulting quantized data is more than the targeted fixed length value or whether the quantity of the resulting quantized data is equal to the targeted fixed length value.

If, as a result of judgment at step S9, the quantity of the quantized data is less than the fixed length value target, the index is advanced at step S10 to the next macro-block $M_{j=j+1}$ in order to revert to the processing at step S7 and in order to repeat the step S7–S9.

Alternatively, if the quantity of the resulting quantized data is equal to the fixed length value target, the quantization step information of the macro-block $M_j$ is set as the second quantization step $Q_j$ in order to output the quantization steps $Q_0$ to $Q_4$ for the macro-blocks $M_0$ to $M_4$ to the quantization circuit 25.

Alternatively, if the quantity of the resulting quantized data exceeds the fixed length value target, the quantization step information of the macro-block $M_j$ is decremented by one in order to set at step S11 the quantization step information for the macro-block $M_j$ as the quantization step $Q_j$ ($=Q_j-1$) and in order to output the quantization steps $Q_0$ to $Q_4$ for the macro-blocks $M_0$ to $M_4$ to the quantization circuit 25.

The quantization steps are determined on the macro-block basis by the first quantization step decision circuit 23 and the second quantization step decision circuit 24 as described above in order to carry out the quantization with the quantization step as determined by the quantization circuit 25. The variable length encoding circuit 28 adds the quantization step information to the quantized data on the macro-bloc basis as shown in FIGS. 4 and 5 and forms fixed bit length codes which are outputted to the framing unit 3.

The quantization steps determined by the first quantization step decision circuit 23 and the second quantization step decision circuit 24 are also supplied as the subsidiary information to the reproducing system, not shown.

The processing by the respective components of the framing unit 3 is now explained.

The deshuffling circuit 31 deshuffles the dc components from the DCT circuit 14 and the ac components quantized with the quantization step accorded on the macro-block basis by the variable length encoding circuit 26 and re-arrays the macro-blocks in a continuous sequence on the picture.

The parity appending circuit 32 appends the synchronization codes $sync_0$ to $sync_4$, identification codes $ID_0$ to $ID_4$ and parities $P_0$ to $P_4$ in order to constitute sync blocks $SB_0$ to $SB_4$ making up one video segment.

Figure 8:
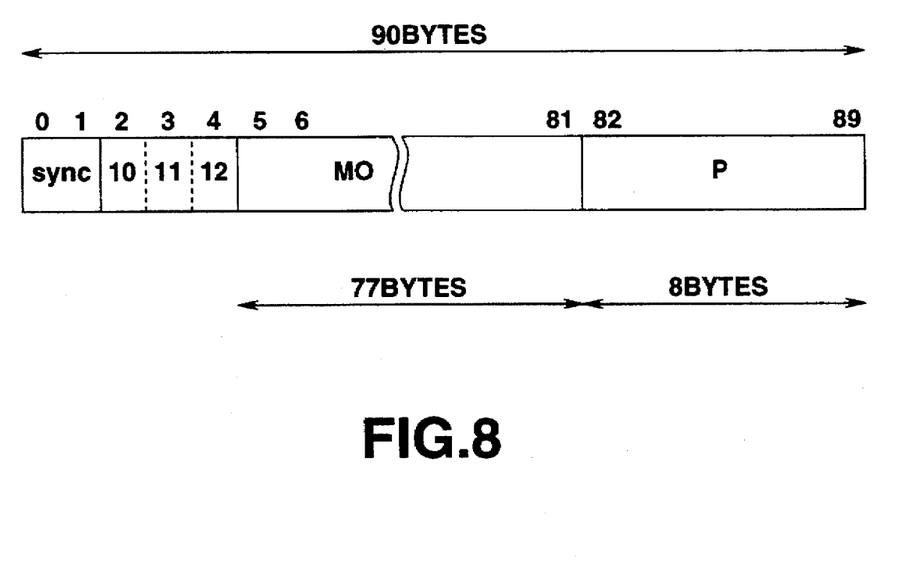
FIG. 8 illustrates the construction of each sync block of the above-mentioned video segment.

That is, referring to FIG. 8, each sync block is made up of 90 bytes, i.e., 16-bit or 2-byte synchronization code sync as an area for recognition of the leading end of the sync by two sync patterns, 3-byte identification codes ID0 to ID2, 77-byte sync block SB fixed in bit length and quantized as described above and 8-byte parity P as error correcting parity data.

Figure 9:
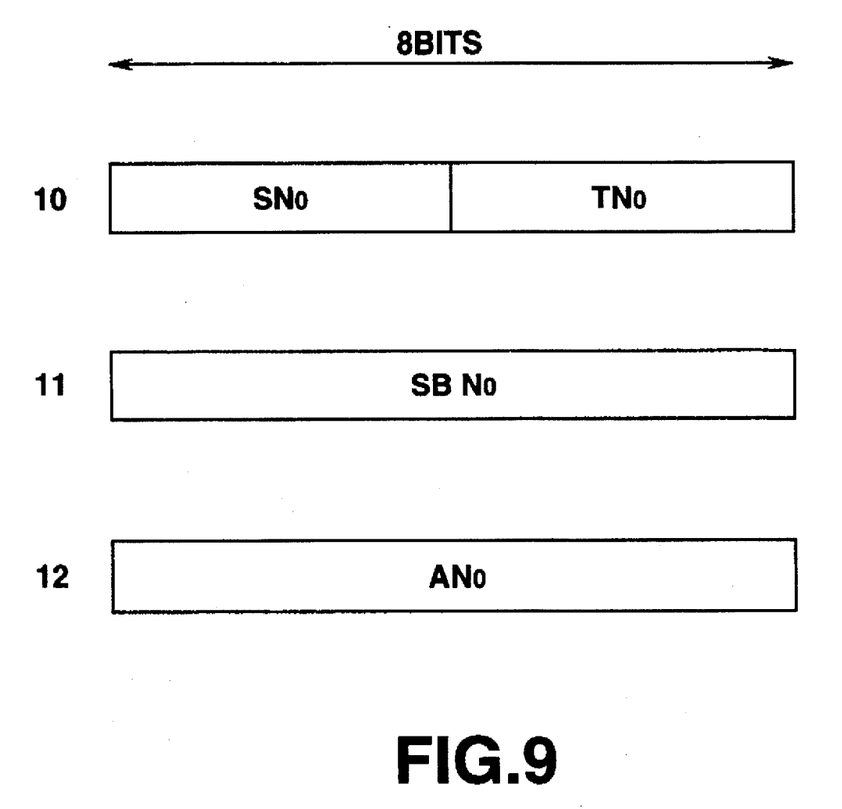
FIG. 9 illustrates the construction of the discrimination code of the sync block.

As for the identification codes I0 to I2, the identification code I0 is made up of a sequence number SNo, while the identification codes I1 and I2 are constituted by a sync block number SBNo and an application number ANo, respectively as shown in FIG. 9.

Figure 7:
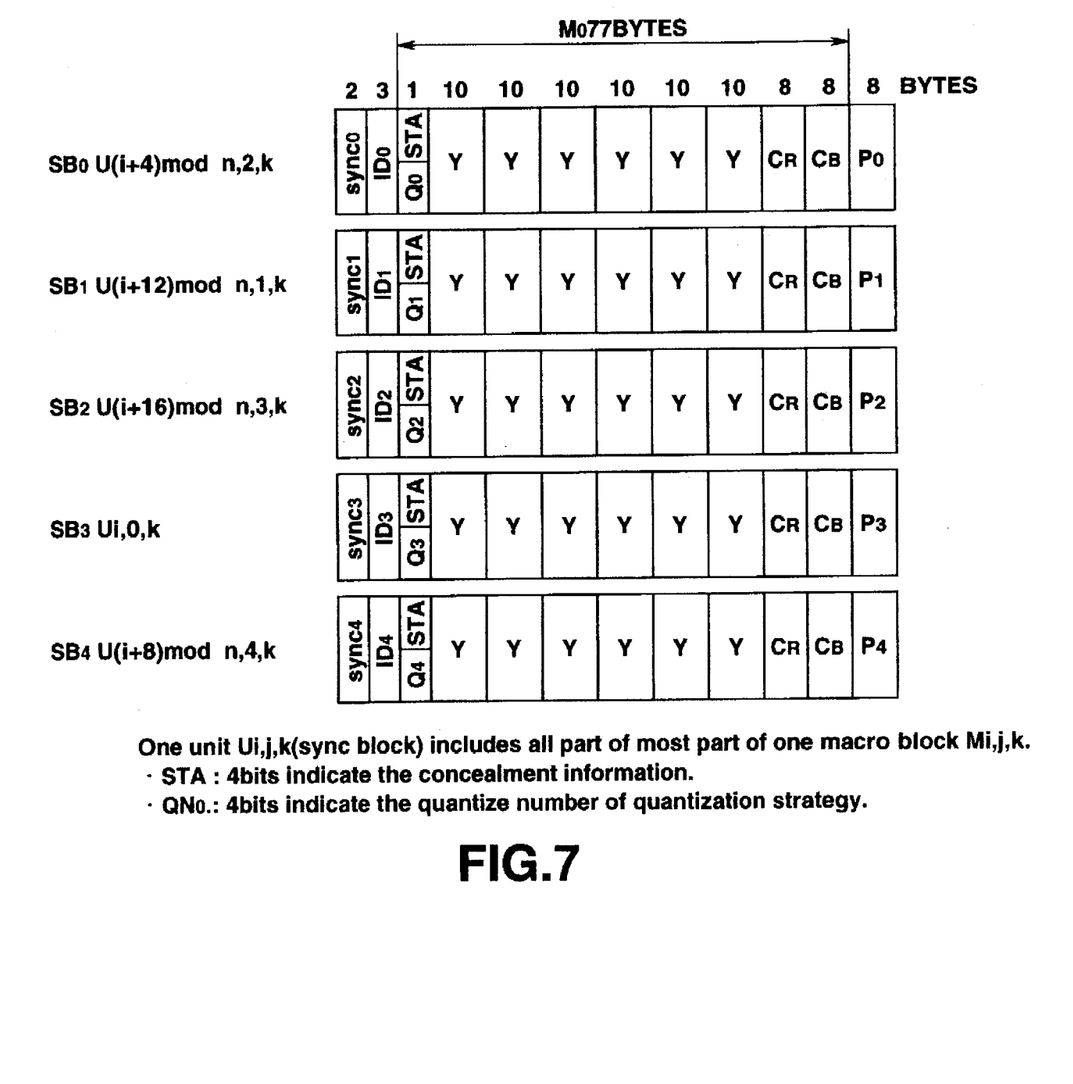
FIG. 7 illustrates the construction of a video segment.
Figure 10:
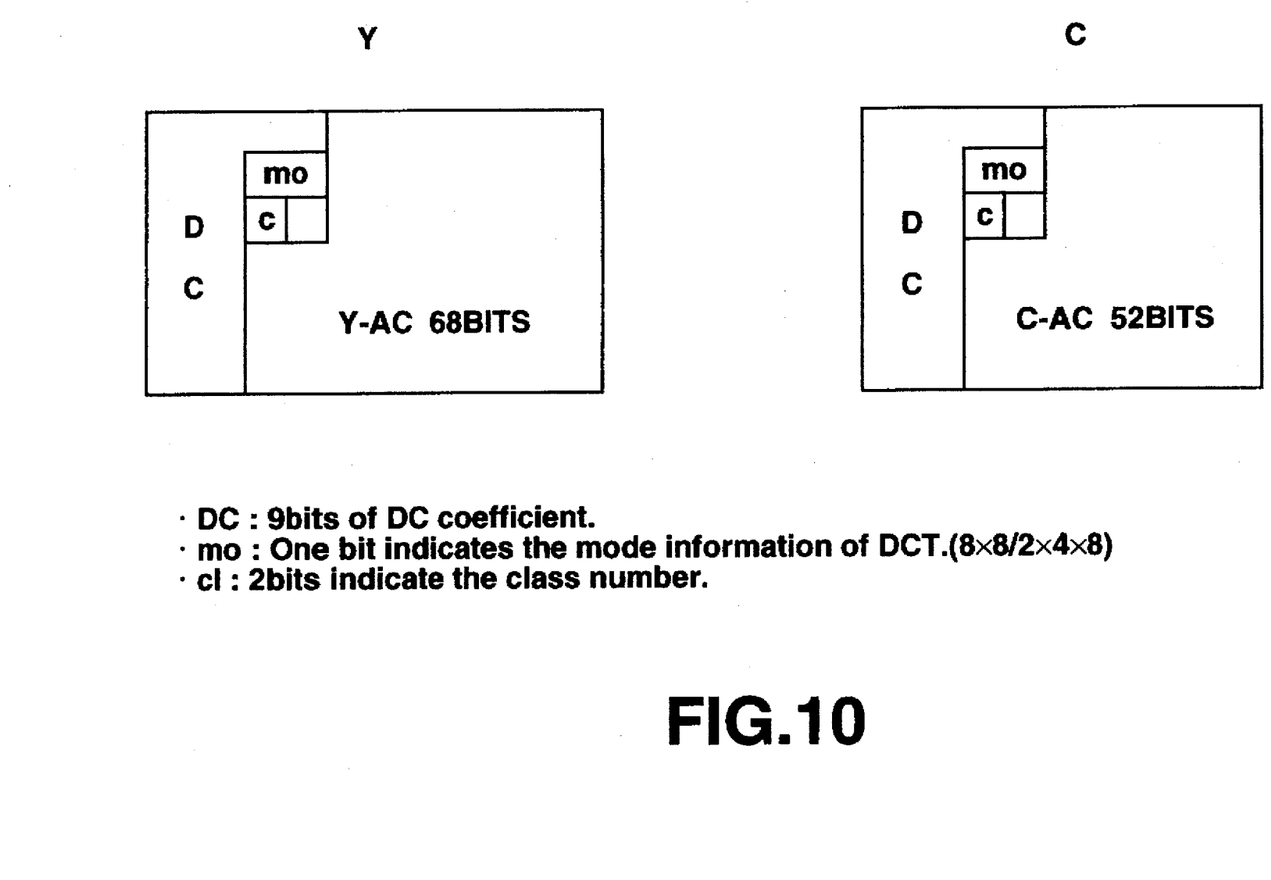
FIG. 10 illustrates the construction of DCT blocks of the luminance data, R-Y data and R-B data in the sync block.

Each of the luminance data Y and the color difference data $C_R$, $C_B$, shown in FIG. 7, is made up of a 9-bit dc component, a 1-bit mode data mo specifying one of 8×8/2× 4×8 block sizes used for DCT by the DCT circuit 13, the classification information c1 obtained by the data quantity estimation circuit 21 and the fixed-length ac component of luminance data (for luminance data Y) or of color difference data (for the color difference data $C_R$ and $C_B$), as shown in FIG. 10.

The ac component of the luminance data Y is made up of 68 bits, while the ac components of the color difference data $C_R$, $C_B$ are each made up of 52 bits.

The sync blocks $SB_0$ to $SB_4$, having the parity codes appended thereto, are supplied as one video segment to the channel coding circuit 33. The video segment is channel-coded by the channel coding circuit 33 so as to be recorded at pre-set positions on a magnetic tape by recording means, not shown.

The operation of the encoder shown in FIG. 1 is explained.

The blocking circuit 11 divides video signals, converted into digital signals, into DCT blocks each made up of 8×8 pixels, totalling 64 pixels, and forms a macro-block from six DCT blocks of luminance data, one DCT block of color difference data $C_R$ and one DCT block of color difference data $C_B$, totalling eight DCT blocks, in order to output the resulting macro-block to the shuffling circuit 12.

The shuffling circuit 12 shuffles the macro-blocked video signals from the blocking circuit 11 and collects five macro-blocks into one unit which is outputted to the DCT circuit 14 and the motion detection circuit 13. The also unit is referred to herein as unit data.

The motion detection circuit 13 detects the motion of the unit data from the shuffling circuit 12 and outputs the results of detection to the DCT circuit while outputting the same results to the reproducing side as the subsidiary information.

The DCT circuit 14 performs two-dimensional DCT on unit data from the shuffling circuit 12 while selectively switching between the intra-frame pixel values for the 8×8 pixel block unit and inter-field prediction error values 4×8×2 for the pixel block unit by way of performing two-dimensional DCT. The dc components are fed to the deshuffling circuit 31 of the framing unit 3, while the ac components are fed to the picture memory 15 and to the activity detection circuit 16.

The picture memory 15 stores the ac components from the DCT circuit 14.

The activity detection circuit 16 detects the picture activity for the ac components from the DCT circuit 14 and outputs the results of detection to the data quantity estimating circuit 21 of the encoding unit 2 while outputting the same results to the reproducing side as the subsidiary information.

The data quantity estimating circuit 21 classifies the ac components in association with the degree of quantization responsive to the results of detection from the activity detection circuit 12. The classified data is supplied to the first quantization step decision circuit 23.

The first quantization step decision circuit 23 calculates an optimum quantization step for the unit data within a range smaller than the targeted fixed bit length value based upon the classification data from the data quantity estimation circuit 21 and the codes from the Huffman table 22. The calculated quantization step is sent to the second quantization step decision circuit 24.

The second quantization step decision circuit 24 determines the quantization step on the macro-block basis within the range of less than the target fixed bit length value, based upon the quantization step for the unit data supplied from the first quantization step decision circuit 23, while giving priority to the macro-block among the five macro-blocks in the unit data which is located closer to the picture center. The quantization step determined on the macro-block basis is supplied to the quantization circuit 25, while being outputted as the subsidiary information to the reproducing side.

The quantization circuit 25 quantizes the ac components for the unit data stored in the picture memory 15 with the quantization step for the respective macro-blocks from the second quantization step decision circuit 24, and transmits quantized ac components to the variable length encoding circuit 26.

The variable length encoding circuit 26 encodes the quantized ac components from the quantization circuit 25 on the macro-block basis and transmits the encoded ac components to the deshuffling circuit 31 of the framing unit 3.

The deshuffling circuit 31 deshuffles the dc components from the DCT circuit 14 and the quantized and encoded ac components from the variable length encoded ac components and re-arrays the data so that the five macro-blocks of the unit data will be continuous on the picture. The deshuffled five macro-blocks are sent to the parity appending circuit 32.

The parity appending circuit 32 appends parity codes etc. to the five macro-blocks from the deshuffling circuit 31 to form a sync block from the macro-blocks having the parity codes etc. and forms a video segment from the five sync blocks. The resulting video segment is sent to the channel coding circuit 33.

The video segment is channel-coded by the channel coding circuit 33 so as to be transmitted to a recording unit, not shown.

What is claimed is:

1. A method for providing quantized and encoded digital video signals, comprising the steps of:

determining a quantization step in terms of a video segment composed of a plurality of macro-blocks as a unit so that a quantity of quantized data is less than a pre-set data quantity, wherein quantization steps for every macro-block constituting the video segment initially are equal to said determined quantization step of the video segment;

modifying the quantization steps associated with each of the plurality of macro-blocks of the video segment individually one at a time in a pre-determined order without exceeding the pre-set data quantity;

quantizing the digital video signal with the determined quantization steps associated with each of the plurality of macro-blocks.

2. The method as claimed in claim 1, wherein the step of modifying the quantization steps comprises giving priority to a macro-block which is located at a center of a picture.

3. The method as claimed in claim 1, wherein the step of determining the quantization step in terms of a video segment comprises calculating an optimum quantization step for each of the luminance signals and color signals of the video signals by arithmetic operations.

4. The method as claimed in claim 1, wherein the number of the macro-blocks in the video segment is five.

5. Apparatus for providing quantized and encoded digital video signals, comprising:

means for determining a quantization step in terms of a video segment composed of a plurality of macro-blocks as a unit so that a quantity of quantized data is less than a pre-set data quantity, wherein quantization steps for every macro-block constituting the video segment initially are equal to said determined quantization step of the video segment;

means for modifying the quantization steps associated with each of the plurality of macro-blocks of the video segment individually one at a time in a pre-determined order without exceeding the pre-set data quantity;

means for quantizing the digital video signal with the determined quantization steps associated with each of the plurality of macro-blocks.

6. The apparatus as claimed in claim 5, wherein said modifying means is operable to give priority to a macro-block which is located at a center of a picture.

7. The apparatus as claimed in claim 5, wherein the means for determining the quantization step in terms of a video segment comprises means for calculating an optimum quantization step for each of the luminance signals and color signals of the video signals by arithmetic operations.

8. The apparatus as claimed in claim 5, wherein the number of the macro-blocks in the video segment is five.

* * * * *